US005772075A

United States Patent [19]

Ash, Jr. et al.

[11] Patent Number: 5,772,075

[45] Date of Patent: Jun. 30, 1998

[54] PORTABLE SLUSH BEVERAGE DISPENSING SYSTEM

[76] Inventors: William O. Ash, Jr.; Fred L. Ash, both of 2537 S. Gessner, No. 216, Houston, Tex. 77063

[21] Appl. No.: 599,945

[22] Filed: Feb. 14, 1996

[51] Int. Cl.[6] ...................................................... G01F 11/00

[52] U.S. Cl. ........................... 222/1; 222/146.6; 222/175; 222/190; 222/226; 222/399

[58] Field of Search ............................ 222/1, 146.6, 175, 222/190, 226, 399, 401

[56] References Cited

U.S. PATENT DOCUMENTS

| | | | |
|---|---|---|---|
| 563,829 | 7/1896 | Wilbraham | 222/401 |
| 4,362,256 | 12/1982 | Polasek | 222/401 |
| 4,470,522 | 9/1984 | Lents et al. | 222/146.6 X |
| 5,385,275 | 1/1995 | Billet | 222/175 X |
| 5,529,220 | 6/1996 | Credle, Jr. | 222/175 |
| 5,588,558 | 12/1996 | Cox et al. | 222/146.6 X |

*Primary Examiner*—Joseph Kaufman
*Attorney, Agent, or Firm*—Kenneth A. Roddy

[57] ABSTRACT

A portable beverage dispenser system particularly suited for dispensing semi-frozen slush beverages is housed within a back pack and transported on the back of a vendor. The slush beverage is contained in an insulated vessel having a sealed closure lid, a gas supply valve connected with a pressurized gas tank to maintain pressurization of the beverage, a slush delivery conduit with an insulated dispensing hose releasably connected to the conduit, and an agitator contained within the vessel which is rotated by a motor on the vessel exterior. The motor is selectively operated by a battery pack carried by the back pack to swirl the slush beverage adjacent the lower end of the delivery conduit and to prevent the semi-frozen slush beverage from solidifying as it is being discharged. The vessel is surrounded by a thermally insulating jacket which prevents the formation of a thin layer of ice on its exterior due to the temperature of the semi-frozen slush beverage contained therein. The slush beverage vessel including the motor and the pressurized gas supply tank including a recharging manifold assembly are carried in the back pack. In a preferred embodiment the central compartment may be divided by walls to define individual compartments for receiving the components. The side wall of the back pack may be provided with an opening through which the dispensing hose extends when in use.

17 Claims, 3 Drawing Sheets

PORTABLE SLUSH BEVERAGE DISPENSING SYSTEM

FIELD OF THE INVENTION

This invention relates generally to beverage dispensers of the type adapted to be carried on the back of a vendor, and more particularly to a portable slush beverage dispensing system carried on the back of a vendor and having an insulated slush dispensing vessel with a motorized agitator and a power source and a gas pressurizing member connected to the vessel for maintaining gas pressure on the beverage.

BRIEF DESCRIPTION OF THE PRIOR ART

"Slush" beverages, as the term is used herein, are defined as a thick semi-frozen beverage having a semi-solid ice consistency, similar to partly melted snow, and consist of a mixture of flavored liquid or syrup, frozen crystals of the liquid or syrup, and other materials. Examples of "slush" beverages are frozen cocktails, such as a "frozen margarita" or "daquiri", and flavored soft drinks or carbonated drinks, such as the popular slush beverage known commercially as an "icee" or a "slurpy" which are available at convenience stores and fast food chains. The slush type beverages are normally dispensed from a special machine at a fixed location and thus are not widely vended at sports stadiums, and other locations remote from the special machine required to make the beverages.

Because of the viscosity of the frozen semi-solid ice crystals, prior art and conventional "liquid" beverage dispensors are not suitable for storing and dispensing a "slush" beverage, because there is no provision for agitating the slush to maintain its consistency and the small orifices of the conventional "liquid" beverage dispensers will freeze up or become plugged with the frozen ice crystals. Also, conventional metal vessels or containers, if uninsulated, may develop a thin layer of ice on their exterior due to the temperature of the semi-frozen slush.

Portable liquid beverage dispensers adapted to be transported on the back of a vendor by use of a body harness are also known in the art, as disclosed by way of example, in U.S. Pat. No. 2,684,787 to Charpiat and U.S. Pat. No. 2,808,965 to Grafia et al. Such portable dispensers include a tank made of rigid material enclosing a liquid storing chamber from which the beverage is dispensed and into which the beverage is charged through a reloading valve connected to the bottom of the tank. The beverage is accordingly dispensed under a gravitational pressure head. To assist in dispensing of the beverage, particularly when the liquid within the tank becomes depleted, the tank chamber may be internally pressurized with air by means of a pump as disclosed, for example, in U.S. Pat. No. 3,147,889 to Dolgin.

Motsenbocker, U.S. Pat. No. 4,420,097 discloses a portable liquid dispenser having an insulated carrying case which contains a first flexible container and a second flexible container positioned therein. A freezable liquid is contained in the second container and the liquid to be dispensed is contained in the first container in contact with the surface of the container with the frozen liquid to cool the liquid to be dispensed. The liquid is dispensed under gravitational pressure.

Boxer et al, U.S. Pat. No. 4,526,298 discloses a flexible water bag or pouch which may be insulated that is carried on shoulder straps similar to a back pack. The liquid is dispensed by a squeeze type dispensing nozzle.

Ash, U.S. Pat. Nos. 4,896,402 and 5,199,609, incorporated herein by reference, disclose a rigid dispenser tank with an outer insulated jacket and an interior flexible bladder which is pressurized to maintain the liquid under pressure.

Sims, U.S. Pat. No. 3,662,929 discloses a non-insulated rigid container with interior flexible bladder connected to a source of fluid pressure. A fluid substance to be dispensed is stored in the rigid container and the flexible bladder is inflated to discharge the fluid substance under pressure.

Uhlig, U.S. Pat. No. 4,098,434 discloses a non-insulated fluid product dispenser having first container and a second flexible container positioned inside the first container. Fluid to be dispensed is contained in one of the containers and fluid under pressure is introduced into the other container to urge the product fluid through a dispensing nozzle or opening.

Cornelius, U.S. Pat. No. 2,513,455 discloses a non-insulated rigid dispenser tank with an interior flexible bladder connected to a gas container. Fluid to be dispensed is stored in the rigid dispenser tank. The gas fed to the bladder condenses at the pressure and temperature at which the fluid in the container is to be discharged.

Shy, U.S. Pat. No. 4,300,705 discloses a compressed vacuum insulated bottle which operates by siphonage and compression of an elastic pouch in the top of the bottle stopper to siphon boiling water into the elastic pouch and then to drain off the boiling water by compression.

Billet, U.S. Pat. No. 4,921,143 discloses a portable beverage dispenser carried on the back of a vendor and has an insulated tank for containing a beverage, a hand pump for manually pressurizing the contents, and a thermally insulated dispensing hose.

The above described "liquid" beverage dispensers are not suitable for use for storing and dispensing a "slush" beverage, because there is no provision for agitating the slush to maintain its consistency and the small orifices and check valves in the dispensing system of the conventional "liquid" dispensers" will freeze up or become plugged with the frozen ice crystals. Also, the conventional uninsulated metal vessels or containers may develop a thin layer of ice on their exterior due to the temperature of the semi-frozen slush.

Beverage dispensers using internal pressurization of the beverage containing tank promote deterioration of internal tank surface so as to limit tank construction to expensive materials, such as stainless steel. Internal pressurization of the beverage tank has also been known to cause, to some extent, degradation in the quality of the beverage, such as loss of carbonation. For obvious health reasons, metal beverage tanks also must be repeatedly and thoroughly cleaned.

The present invention is distinguished over the prior art in general, and these patents in particular by a portable beverage dispenser system particularly suited for dispensing semi-frozen slush beverages housed within a back pack and transported on the back of a vendor. The slush beverage is contained in an insulated vessel having a sealed closure lid, a gas supply valve connected with a pressurized gas tank means to maintain pressurization of the beverage, a slush delivery conduit with an insulated dispensing hose releasably connected to the conduit, and an agitator contained within the vessel which is rotated by a motor on the vessel exterior. The motor is selectively operated by a battery pack carried by the back pack to swirl the slush beverage adjacent the lower end of the delivery conduit and to prevent the semi-frozen slush beverage from solidifying as it is being discharged. The vessel is surrounded by a thermally insulating jacket which prevents the formation of a thin layer of ice on its exterior due to the temperature of the semi-frozen slush beverage contained therein. The slush beverage vessel including the motor and the pressurized gas supply tank including a recharging manifold assembly are carried in the back pack. In a preferred embodiment the central compartment may be divided by walls to define individual compartments for receiving the components. The side wall of the back pack may be provided with an opening through which the dispensing hose extends when in use.

SUMMARY OF THE INVENTION

It is therefore an object of this invention to provide a portable beverage dispensing system which is suitable for containing and dispersing semi-frozen slush beverages.

It is another object of the present invention to provide a portable slush beverage dispensing system which is self contained and suitable to be carried on the back of a vendor.

Another object of this invention to provide a portable slush beverage dispensing system which will allow slush beverages to be served at optimum temperatures, mixtures, and carbonation levels and in a sanitary manner.

A further object of this invention is to provide a portable slush beverage dispensing system having a beverage dispensing tank that is covered by a protective shock absorbing thermally insulating jacket in contact with the tank exterior and which has an outer layer of flexible material.

A still further object of this invention is to provide a portable beverage dispensing system which is aesthetically pleasing, simple in construction, economical to manufacture, and rugged and durable in use.

Other objects of the invention will become apparent from time to time throughout the specification and claims as hereinafter related.

The above noted objects and other objects of the invention are accomplished by a portable beverage dispenser system particularly suited for dispensing semi-frozen slush beverages housed within a back pack and transported on the back of a vendor. The slush beverage is contained in an insulated vessel having a sealed closure lid, a gas supply valve connected with a pressurized gas tank means to maintain pressurization of the beverage, a slush delivery conduit with an insulated dispensing hose releasably connected to the conduit, and an agitator contained within the vessel which is rotated by a motor on the vessel exterior. The motor is selectively operated by a batter pack carried by the back pack to swirl the slush beverage adjacent the lower end of the delivery conduit and to prevent the semi-frozen slush beverage from solidifying as it is being discharged. The vessel is surrounded by a thermally insulating jacket which prevents the formation of a thin layer of ice on its exterior due to the temperature of the semi-frozen slush beverage contained therein. The slush beverage vessel including the motor and the pressurized gas supply tank including a recharging manifold assembly are carried in the back pack. In a preferred embodiment the central compartment may be divided by walls to define individual compartments for receiving the components. The side wall of the back pack may be provided with an opening through which the dispensing hose extends when in use.

DESCRIPTION OF THE PREFERRED EMBODIMENT

Figure 2:
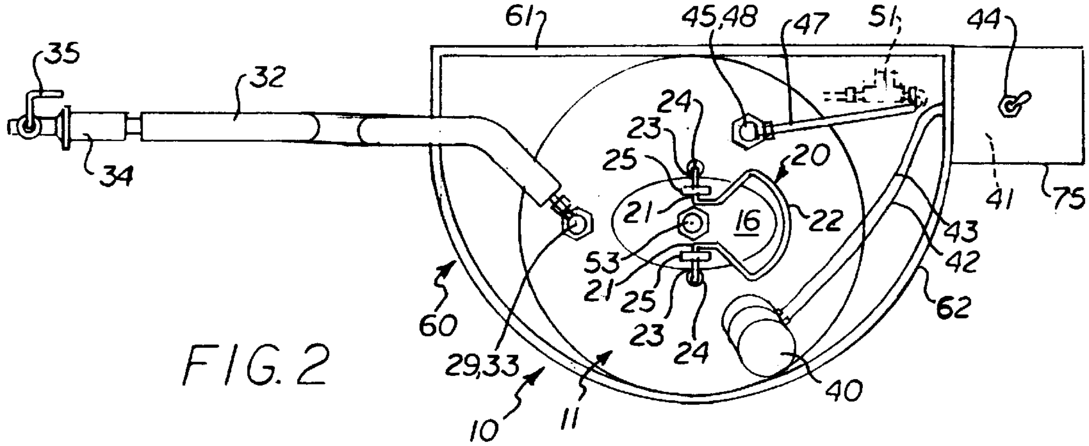
FIG. 2 is a top plan view of the back pack with the lid open and showing the slush beverage dispensing apparatus contained therein.
Figure 1:
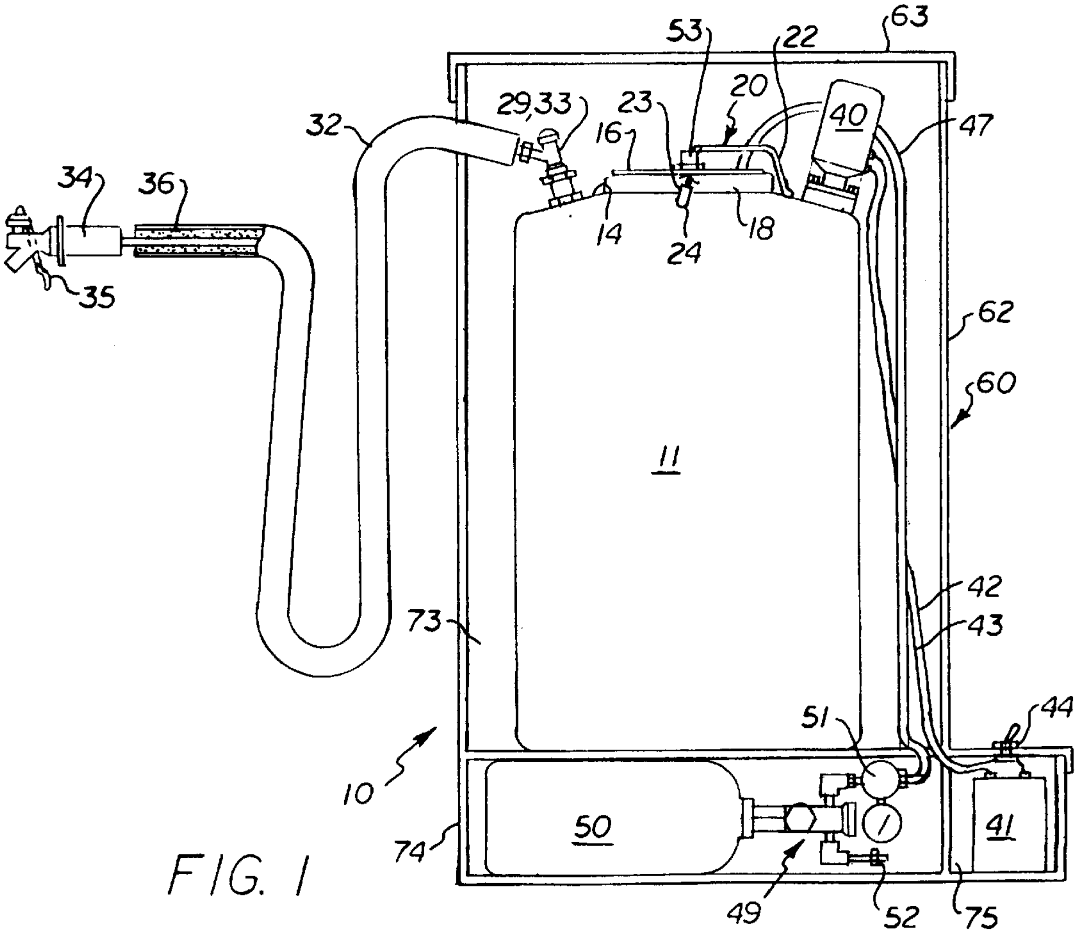
FIG. 1 is a longitudinal cross section through a back pack having the slush beverage dispensing apparatus in accordance with the present invention contained therein.
Figure 3:
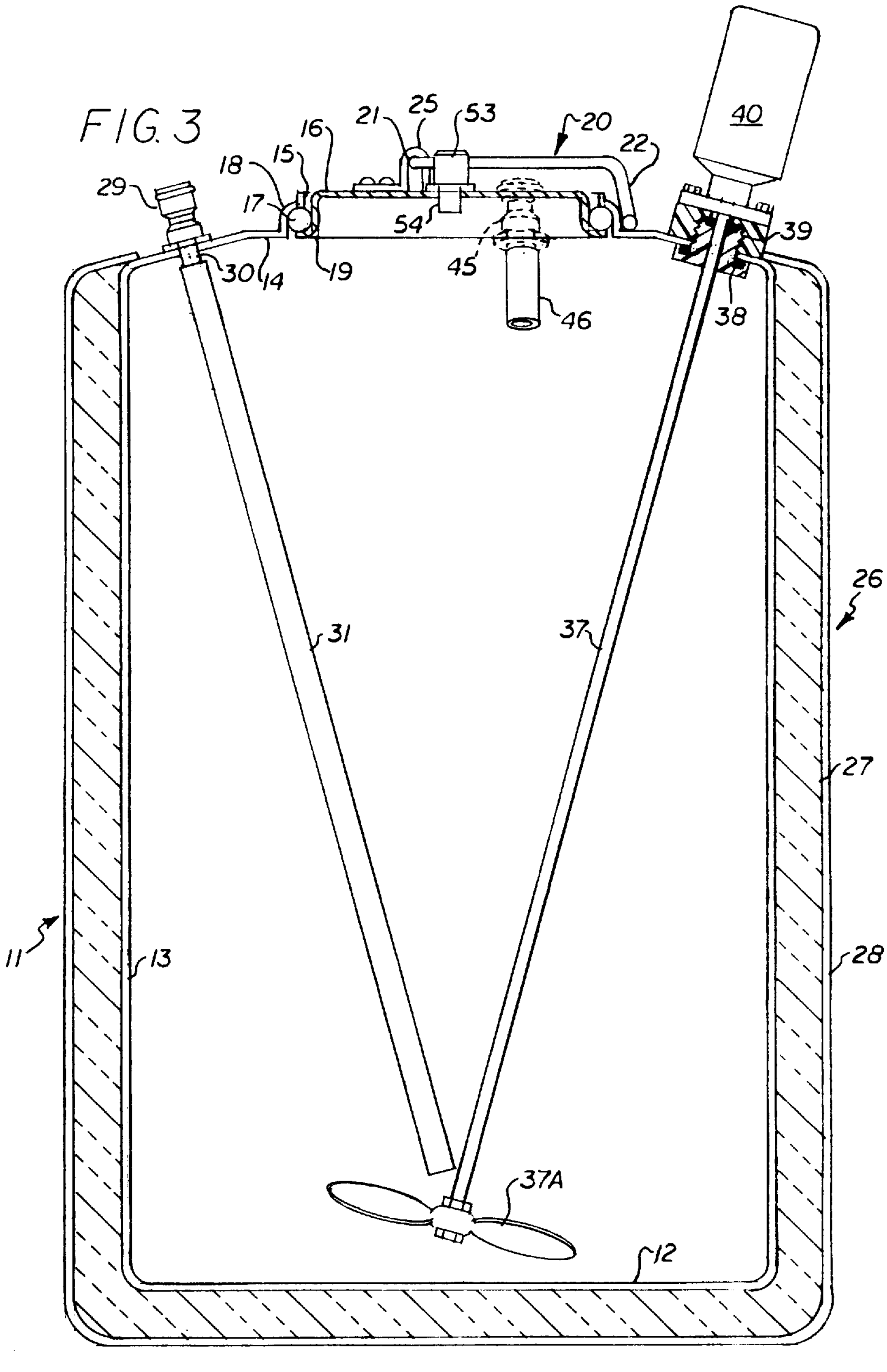
FIG. 3 is a longitudinal cross section through the slush beverage dispensing vessel of the present invention.

Referring to the drawings by numerals of reference, there is shown in FIGS. 1, 2, and 3, a portable slush beverage dispensing system 10 which is carried in a backpack 60. The present dispensing system is particularly adapted for dispensing a thick semi-frozen "slush" beverage having a semi-solid ice consistency, similar to partly melted snow, such as flavored soft drinks or carbonated drinks known commercially as an "icee" or a "slurpy", or frozen cocktails, such as a "frozen margarita" or "daquiri".

As best seen in FIG. 3, the slush beverage dispensing system includes a slush beverage container or vessel 11 made of stainless steel, aluminum, or other suitable material. The vessel 11 has a bottom wall 12, a side wall 13, and a top wall 14. A generally oval-shaped access opening 15 is formed in the top wall 14. The access opening 15 is sealingly closed by an oval-shaped lid closure member 16 on which an annular sealing ring 17 is carried. The opening 15 has a surrounding flange 18 semi-circular in cross section, and the lid closure 16 has an opposite opposed annular semi-circular flange 19. The flanges 18 and 19 cooperate with the sealing ring 17 to form a fluid tight seal at the top of the vessel 11.

As best seen in FIGS. 1 and 2, the lid closure 16 has a releasable latch 20 made of bent rod forming axially aligned pivot shaft portions 21 interconnected by a generally U-shaped portion 22 extending at right angles therefrom. The end of the U-shaped portion 22 is curved downwardly for engagement with the top wall 14 of the vessel 11 at the rim of the flanged portion 18 so as to angularly position a pair of leg portions 23 depending from the ends of the shaft portions 21 into frictional engagement with the top of the vessel in the latched condition. The ends of the leg portions 23 are provided with resilient end caps 24. The shaft portions 21 are pivotally restrained on top of the lid 16 by a pair of pivot brackets 25. To release the lid 16 from its sealed condition, the U-shaped portion 22 of the latch 20 is pivoted upwardly to angularly displace the leg portions 23 out of engagement with the top 14 of the vessel 11. The lid 16 may then be removed from the access opening 15. Due to the viscosity of the frozen semi-solid ice crystals, the vessel 11 is preferably filled with the thick semi-frozen "slush" beverage by pouring it through the opening 15.

Referring again to FIG. 3, the exterior of the vessel 11 is substantially surrounded by a thermally insulating and shock absorbing jacket 26. The jacket 26 is formed of a dense layer 27 of thermally insulating and shock absorbent elastomeric material such as foam plastic or foam rubber in contact with the tank exterior and has an outer layer or skin 28 of flexible material such as flexible plastic or rubber. The jacket 26 insulates the vessel 11 and prevents the formation of a thin layer of ice on its exterior due to the temperature of the semi-frozen slush beverage contained therein, and also serves a shock absorber or cushion.

A quick-release type slush dispensing check valve 29 is connected to the top wall 14 of the vessel. 11 and has a passageway 30 extending through the wall. A tubular dispensing tube 31 connected at one end to the passageway 30 extends downwardly into the interior of the vessel 11 and terminates a short distance from the bottom wall 12. As seen in FIGS. 1 and 2, a dispensing hose 32 is connected to the slush dispensing valve 29 by a quick-release coupling 33 at one end and its distal end is connected to a selectively operable slush dispensing nozzle 34 having a trigger mechanism 35. The dispensing hose 32 has an outer covering 36 of flexible insulating material.

The orifices and check valve element in the dispensing valve 29, the interior of the dispensing tube 31, dispensing hose 32 and its dispensing nozzle 34 are sized to allow passage of the slush beverage and to prevent them from becoming plugged with frozen ice crystals.

A shaft 37 extends through the top wall 14 of the vessel 11 and is provided with suitable seals 38 and 39 between the exterior of the shaft and interior of the vessel to allow rotary motion of the shaft in a sealed relation. The upper end of the shaft 37 is connected to a drive motor 40, such as a direct current electric motor, secured to the exterior of the vessel. As seen in FIG. 1, the motor 40 is powered by a battery pack 41 carried in or on the back pack 60 and connected by leads 42 and 43 to the motor. Operation of the motor 40 is controlled manually by a switch 44 carried in or on the back pack 60 and connected through one of the leads 42. An agitator blade 37A secured on the lower end of the shaft 37 is rotatably disposed adjacent the lower end of the dispensing tube 31 to swirl the slush beverage adjacent the dispensing tube lower end and to prevent the semi-frozen slush beverage from solidifying as it is being discharged.

Referring again to FIG. 3, a quick-release type gas fill and recharging check valve 45 is connected to the top wall 14 of the vessel 11 and has a passageway extending through the wall and connected with a tubular extension 46 which extends a short distance into the top portion of the vessel. As seen in FIGS. 1 and 2, a gas supply hose 47 is connected to the gas fill and recharging valve 45 by a quick-release coupling 48 at one end and its distal end is connected to a recharging manifold assembly 49 connected to a pressurized gas supply tank 50 which is carried in the back pack 60. As explained hereinafter, the pressurized gas supply tank 50 carried in the back pack maintains the slush beverage under pressure after the vessel 11 is filled with the beverage and initially charged with gas. Alternatively, a hand pump (not shown) may be used in place of the pressurized gas supply tank. Such a hand pump is described in applicant's U.S. Pat. No. 4,869,402, which is incorporated herein by reference.

Pressurized gas from the supply tank 50 is supplied to the slush beverage vessel 11 through the recharging manifold 49 which includes an adjustable pressure regulator 51 and a quick-release type check valve 52. The quick-release check valve 52 is used to refill the pressurized gas supply tank 50 and the pressure regulator 51 maintains the desired gas pressure on the semi-frozen slush beverage in the vessel 11 being dispensed through the selectively operable dispensing nozzle 34. The slush beverage is forced up the dispensing tube 31 and out through the dispensing hose 32 and dispensing nozzle 34.

Optionally, a pressure relief valve 53 having a passageway 54 extending into the interior of the vessel 11 may also be connected to the lid 16 or top wall 14 of the vessel 11. The pressure relief valve 53 serves as a safety valve and will open should the pressure within the vessel 11 exceed a predetermined level, or for depressurizing the interior of the vessel when desired.

Figure 4:
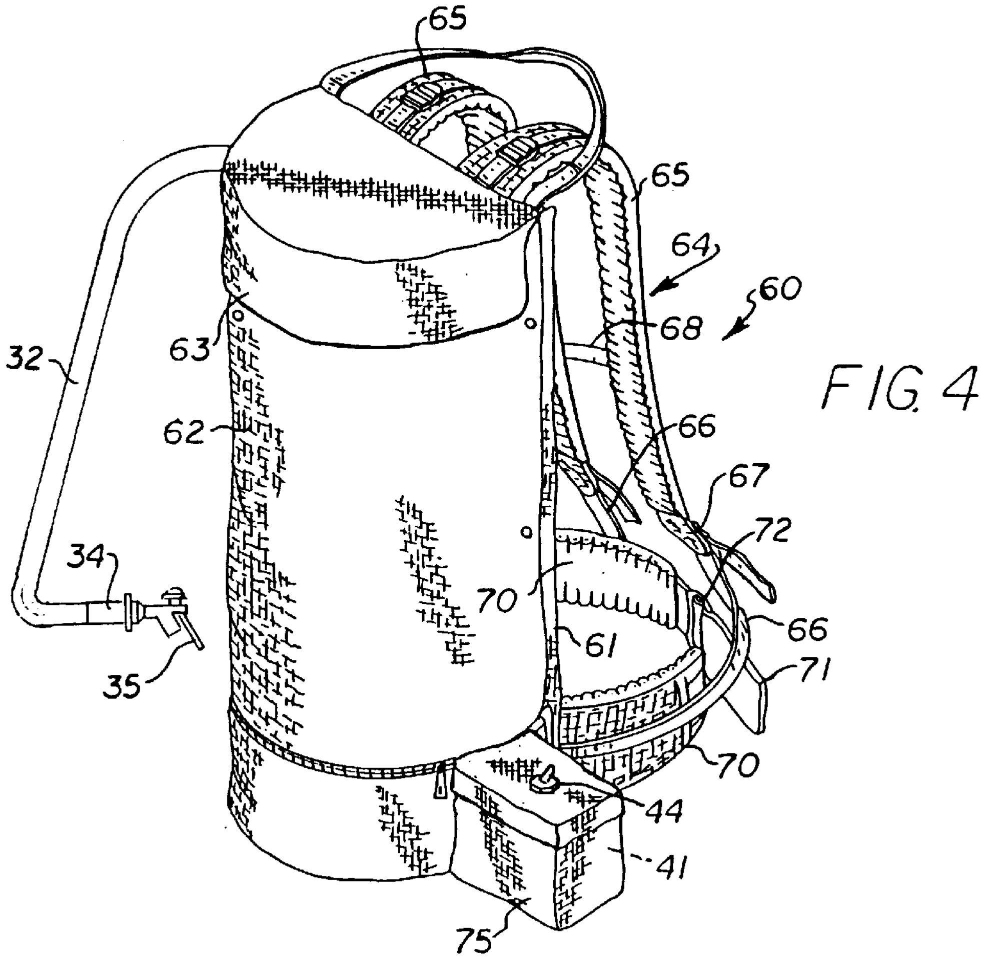
FIG. 4 is an isometric view of the back pack having the slush beverage dispensing apparatus contained therein.
Figure 5:
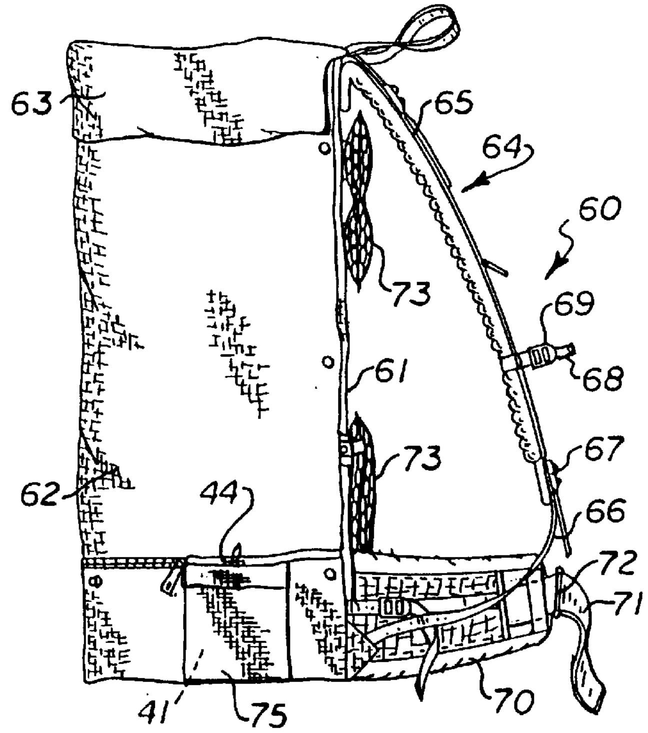
FIG. 5 is a side elevation of the back pack.

As best seen in FIGS. 4 and 5, in a preferred embodiment, the back pack 60 has a back wall 61, a side wall 62 and a top closure 63 defining a central interior compartment. A shoulder harness 64 is secured to the back pack 60 and has a pair of padded shoulder straps 65, each of which are connected to the back pack by an adjustment strap 66 and adjustment buckle 67 and are interconnected by a transverse chest strap 68 and adjustment buckle 69 to permit proper adjustment of the shoulder straps about the shoulders and chest of a vendor. The back pack 60 is also provided with a pair of padded waist belt sections 70 interconnected by an adjustment strap 71 and adjustment buckle 72 for encircling the waist of the vendor. One or more back pads 73 may also be secured to the back wall 61 of the back pack 60 to provide added comfort to the wearer.

As shown in FIG. 1, the slush beverage dispensing vessel 11 including the motor 40, the pressurized gas supply tank 50 with the recharging manifold assembly 49 are carried in the back pack 60. In a preferred embodiment the central compartment of the back pack may be divided by walls to define individual compartments for receiving the components. For example, the back pack 60 may be provided with an upper compartment 73 for containing the slush beverage dispensing vessel 11 and motor 40, a lower compartment 74 for containing the pressurized gas supply tank 50 and recharging manifold assembly 49, and a side compartment 75 for containing the battery pack 41. Alternatively, the battery pack 41 and switch may be carried on a waist belt section 70, rather than in a side compartment.

The side wall 62 of the back pack 60 may also be provided with an opening through which the dispensing hose 32 extends. When not in use, the dispensing hose 32 may be stored inside the back pack.

It should be understood that the electric motor 40 may be replaced by a hydraulic or pneumatic motor, that the battery pack 41 may be replaced by a pressurized cylinder containing a fluid under pressure as the power source for operating the motor, and that the switch 44 may be replaced by a control valve for controlling the operation of the motor. The pressurized cylinder power source and control valve may be carried in the side compartment 75 or may be attached to a waist belt section 70, as described with reference to the battery pack and switch.

While this invention has been described fully and completely with special emphasis upon a preferred embodiment, it should be understood that within the scope of the appended claims the invention may be practiced otherwise than as specifically described herein.

We claim:

1. A portable slush beverage dispensing system comprising:

a vessel having a side wall defining an interior chamber and an access opening at one end thereof;

a releasably locked closure lid removably and sealingly mounted within said vessel opening;

gas filling valve means on said side wall with a passageway in communication with said interior chamber and adapted to be connected with gas pressurizing means to effect pressurization of a slush beverage contained within said vessel;

a slush delivery conduit having a first end in communication with said interior chamber and a hose connection at a second end on said side wall adapted to be connected with a hose for dispensing said pressurized slush beverage contained within said vessel;

rotating agitator means having a shaft extending through said side wall in sealed relation with an agitator blade at a first end rotatably disposed in said chamber to swirl said slush beverage adjacent said delivery conduit first end and a second end exterior of said chamber adapted for connection to a motor for rotating said agitator blade; and motor means exterior of said chamber connected with a power source and with said shaft second end for rotating said agitator blade.

2. The slush beverage dispensing system according to claim 1 further comprising gas pressurizing means operatively connected to said gas filling valve means to effect pressurization of said slush beverage contained within said chamber.

3. The slush beverage dispensing system according to claim 2 in which said gas pressurizing means comprises a container filled with gas under pressure for effecting pressurization of said slush beverage contained within said chamber.

4. The slush beverage dispensing system according to claim 1 further comprising a flexible hose having a thermally insulated outer covering operatively at one end to said hose connection and a selectively operable slush dispensing valve at an opposite end for dispensing said pressurized slush beverage from said chamber.

5. The slush beverage dispensing system according to claim 1 further comprising a flexible thermally insulating and cushioning jacket closely surrounding the exterior of said side wall of said vessel.

6. The slush beverage dispensing system according to claimed in which said cushioning jacket includes a thermally insulating foam layer surrounded by an outer flexible cover.

7. The slush beverage dispensing system according to claim 1 including a pressure relief valve mounted on said vessel with a sealed passageway in communication with said interior chamber for relieving excess pressure therein.

8. The slush beverage dispensing system according to claim 1 further comprising;

a back pack adapted to be worn by a vendor and having a central storage compartment, and said vessel and said motor means are removably received and carried within said central storage compartment.

9. The slush beverage dispensing system according to claim 8 further comprising;

a power source carried on said back pack and connected with said motor means, and manual control means carried on said back pack and connected with said power source and said motor means for selectively controlling the operation of said motor means.

10. The slush beverage dispensing system according to claim 8 further comprising;

gas pressurizing means carried in said back pack storage compartment and operatively connected to said gas filling valve means to effect pressurization of said slush beverage contained within said chamber.

11. A portable slush beverage dispensing system carried on the body of a person for dispensing slush beverages comprising:

a back pack adapted to be worn by a person and having a central storage compartment;

a vessel removably received in said central storage compartment and having a side wall defining an interior chamber and an access opening at one end thereof;

a releasably locked closure lid removably and sealingly mounted within said vessel opening;

gas filling valve means on said side wall with a passageway in communication with said interior chamber and adapted to be connected with gas pressurizing means to effect pressurization of a slush beverage contained within said vessel;

a slush delivery conduit having a first end in communication with said interior chamber and a hose connection at a second end on said side wall adapted to be connected with a hose for dispensing said pressurized slush beverage contained within said vessel;

a flexible hose having a thermally insulated outer covering releasably connected at one end to said hose connection and a selectively operable slush dispensing valve at an opposite end for dispensing said pressurized slush beverage from said chamber;

rotating agitator means having a shaft extending through said side wall in sealed relation with an agitator blade at a first end rotatably disposed in said chamber to swirl said slush beverage adjacent said delivery conduit first end and a second end exterior of said chamber adapted for connection to a motor for rotating said agitator blade; and motor means exterior of said chamber connected with a power source and with said shaft second end for rotating said agitator blade.

12. The portable slush beverage dispensing system according to claim 11 further comprising gas pressurizing means carried in said back pack storage compartment and operatively connected to said gas filling valve means to effect pressurization of said slush beverage contained within said chamber.

13. The portable slush beverage dispensing system according to claim 12 in which said gas pressurizing means comprises a container filled with gas under pressure for effecting pressurization of said slush beverage contained within said chamber.

14. The portable slush beverage dispensing system according to claim 11 further comprising a flexible thermally insulating and cushioning jacket closely surrounding the exterior of said side wall of said vessel.

15. The portable slush beverage dispensing system according to claim 14 in which said cushioning jacket includes a thermally insulating foam layer surrounded by an outer flexible cover.

16. The portable slush beverage dispensing system according to claim 11 including a pressure relief valve mounted on said vessel with a sealed passageway in communication with said interior chamber for relieving excess pressure therein.

17. A method of transporting and dispensing a slush beverage comprising the steps of;

providing a back pack adapted to be worn by a person and having a central storage compartment;

removably installing gas pressurizing means in said back pack storage compartment;

providing a vessel having a side wall defining an interior chamber, an access opening at one end thereof, a releasably locked closure lid removably and sealingly mounted within said vessel opening, gas filling valve means on said side wall with a passageway in communication with said interior chamber, a slush delivery conduit having a first end in communication with said interior chamber and a hose connection at a second end on said side wall, rotating agitator means having a shaft extending through said side wall in sealed relation with an agitator blade at a first end rotatably disposed in said chamber and a second end connected with a motor exterior of said chamber for rotating said agitator blade;

filling said vessel interior chamber with a slush beverage;

removably installing said vessel and said motor in said back pack storage compartment;

removably connecting said gas pressurizing means to said filling valve means to effect pressurization of said slush beverage contained within said chamber;

releasably connecting one end of a flexible hose to said hose connection, said hose having a selectively operable slush dispensing valve at an opposite end;

selectively activating said motor to rotate said agitator means and swirl said slush beverage adjacent said delivery conduit first end; and selectively activating said slush dispensing valve at said opposite end of said hose to dispense said pressurized slush beverage from said chamber.

* * * * *